Aug. 6, 1946.   C. P. ABRAMS   2,405,483
APPARATUS FOR INSPECTING MANUFACTURED ARTICLES
Filed Oct. 2, 1943   4 Sheets-Sheet 1

Inventor
Cecil P. Abrams
By Merchant & Merchant
Attorneys

Aug. 6, 1946.   C. P. ABRAMS   2,405,483
APPARATUS FOR INSPECTING MANUFACTURED ARTICLES
Filed Oct. 2, 1943   4 Sheets-Sheet 2

Inventor
Cecil P. Abrams
By
Merchant & Merchant
Attorneys

Aug. 6, 1946.            C. P. ABRAMS            2,405,483
APPARATUS FOR INSPECTING MANUFACTURED ARTICLES
Filed Oct. 2, 1943            4 Sheets-Sheet 4

Inventor
Cecil P. Abrams
By Merchant & Merchant
Attorneys

Patented Aug. 6, 1946

2,405,483

UNITED STATES PATENT OFFICE 2,405,483

APPARATUS FOR INSPECTING MANU-
FACTURED ARTICLES

Cecil P. Abrams, Anoka, Minn.

Application October 2, 1943, Serial No. 504,667

9 Claims. (Cl. 209—111)

This invention relates to apparatus for automatically inspecting certain manufactured articles. While various kinds of articles may be tested or inspected, the invention particularly deals with articles having a surface which must meet certain requirements. While various types of surfaces may be inspected or tested in the particular embodiment of the invention illustrated, it is shown as constructed and arranged for testing or inspecting a surface of general cylindrical, conical or spherical form. Specifically the invention is illustrated for testing a cylindrical part such as the metal cup of a shotgun shell. These shells must meet certain requirements as to the finished structure and it is desirable to inspect the cups and reject the imperfect ones before the cup is assembled with paper cylinders into a shotgun shell. If the metal cup is found to be defective and discarded, much time, labor and expense will be saved over having the defect discovered after the assembly of the article has been made. The inspection is made by means of light and the rejection of imperfect caps accomplished by means of an electric circuit controlled by a photoelectric cell. It has heretofore been proposed to test articles in the above manner but the mechanism for so doing has been very complicated and cumbersome. In some such attempts the article itself has been moved to various stations and rotated while having a stationary beam of light directed thereon. This requires much accurate positioning of the article and excessive mechanism.

It is an object of this invention to provide a simple and efficient apparatus for testing or inspecting certain manufactured articles in which the article is held in stationary position while a beam of light is moved along the surface thereof to be tested or inspected.

It is a further object of the invention to provide an apparatus in which the article having a surface to be tested is held stationary and a rotatable means for directing light is disposed adjacent said article and light is transmitted by said means to move along said surface together with means actuated by a photoelectric cell for rejecting the said article should said light travel over imperfections in said surface so that it would not be reflected therefrom.

It is another object of the invention to provide an apparatus for testing an article having a surface to be tested comprising means for causing a beam of light to travel along said surface, means for directing said article along one path if said light is properly reflected from said surface and means for directing said article along another path to reject the same should the light be not properly reflected from said surface.

It is still further an object of the invention to provide an apparatus for testing the surface of an article comprising means for moving a beam of light along said surface, said light being reflected from said surface, means for moving said article along one path if said surface is continuous and means actuated by means of the light reflected from said surface for moving said article along the path to reject the same if said beam of light moves over an interruption in said surface.

It is still further an object of the invention to provide an apparatus for inspecting or testing an article and particularly a surface thereof comprising movable means for causing a beam of light to travel along said surface, said light being reflected from said surface to a photoelectric cell and means for moving said article along one path if said light is continuously reflected from said surface and means controlled by said photoelectric cell for moving said article along another path to reject said article if said light is not continuously reflected from said surface due to said beam of light passing over an imperfection in said surface.

It is more specifically an object of the invention to test or inspect a cylindrical member having an open end and an internal surface of general cylindrical form comprising means for holding said article in stationary position, moving means for causing a beam of light to travel along said surface, means for moving said last mentioned means into the open end of said article and into operative position, means for moving said second mentioned means out of said article, means for moving said article in one path if said beam of light is reflected from said surface and means for moving said article in another path to reject the same if said beam of light is not continuously reflected from said surface.

It is still more specifically an object of the invention to provide such an apparatus as set forth in the preceding paragraph in which said movable means for directing said beam of light along said surface is in the form of a rotating mirror rotated by an electric motor and in which said means for directing said article along said other path to reject the same comprises a photoelectric cell, an electrical circuit controlled thereby and means actuated by operation of said electrical circuit.

These and other objects and advantages of the invention will be fully set forth in the following description made in connection with the accompanying drawings in which like reference characters refer to similar parts throughout the several views and in which.

Figures 7, 8, 9:
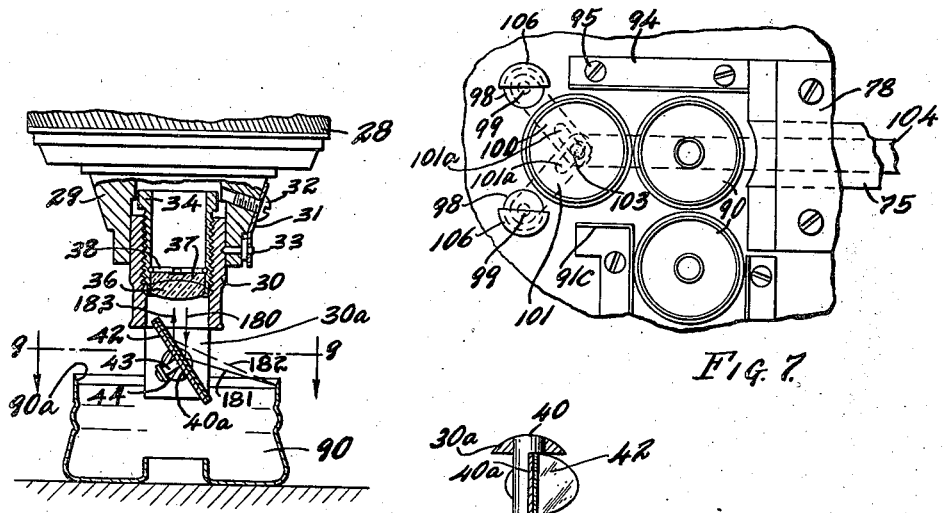
Fig. 7 is a partial view similar to Fig. 6 showing some parts in different positions.
Fig. 8 is a view partly in side elevation and partly in vertical section taken substantially on line 8—8 of Fig. 2, as indicated by the arrow, some parts being omitted
Fig. 9 is a horizontal section taken on line 9—9 of Fig. 8 as indicated by the arrows.

Referring to the drawings a machine is shown comprising a frame 10 illustrated as in the form of a vertically extending channel member having the spaced flanges 10a and said channel member has secured to the front side of its web portion by a threaded stud 11a, nut 11b and washer 11c, a member 11 of trapezoidal shape in horizontal cross section, the same forming a guide means for a vertically movable slide 12. Frame member 10 will be secured to a base 13 of any suitable construction. Slide member 12 has a guideway therein fitting on guide member 11 and an adjustable gib 14 will preferably be disposed between members 11 and 12 in order to maintain an accurate fit between said parts. Slide member 12 has forwardly projecting ears or lugs 12a apertured to receive a pivot member 15 which also passes through and has swingingly mounted thereon a projection 16a of a motor frame or casing 16. Projection 16a has a flat outer surface adapted to engage a similar surface on slide member 12 when said member is in operative position. Casing 16 has mounted therein the usual motor field coils 17 which will be arranged in circumferential relation and an armature 18 is disposed for rotation within said field coils. Said parts are shown diagrammatically as representing an electric motor. Armature 18 has secured thereto and extending axially therethrough a tube 20. Said tube is mounted at the top and bottom of casing 16 in suitable ball bearings 21 and 22. Ball bearings 21 are mounted in casing 16 and in a flanged collar or cap 23 secured in any suitable manner to the bottom of casing 16 about tube 20 and bearings 22 are carried in a flanged cap 24 which may be secured in any suitable manner as by cap screws 25 to the top cover 16b of casing 16. Said cover 16b will be secured to casing 16 by suitable cap screws 26. The lower end of tube 20 is threaded and the same receives a threaded sleeve 28 having a knurled periphery. Sleeve 28 has a lower inwardly extending flange 28a which projects under a cylindrical flange on a member 29, having its upper portion fitted into the lower end of tube 20. Member 29 has a central cylindrical bore into which fits and is movable a lens holding member 30. A leaf spring 31 is secured to the side of member 29 by headed screw 32 and carries at its lower end a pin 33 adapted to extend transversely through an aperture in member 29. Pin 30 has a collar disposed between spring 31 and member 29. Pin 33 is adapted to be received in an aperture in member 30 to hold the same in place in member 29. It will be seen that the lower end of spring 31 and the pin 33 can be easily withdrawn to permit removal or insertion of member 30. Member 30 has a central bore which is enlarged and threaded at its upper end to receive a threaded sleeve 34. A pair of lenses 36 and 37 are disposed in sleeve 34, lens 36 being seated against a shoulder formed in the lower end of sleeve 34, lens 36 being of convexo-convex form and lens 37 being of plano-concave form, fitting against the upper side of lens 36. Said lenses are held in place in member 34 by a suitable retainer such as a split spring snap ring 38 being disposed above lens 37. Member 30 has projecting downwardly therefrom at opposite sides segmental portions 30a between which extends a small shaft or pin 40 having a portion cut away between portions 30a to form a flat surface 40a. A mirror or elliptical form, as shown in Figs. 8 and 9, is secured with its bottom surface against surface 40a, the same having a pin 43 projecting through member 40, said pin being riveted over a small washer 44 engaging the side of member 40. Mirror 42 is thus firmly secured to the shaft 40.

Figure 2:
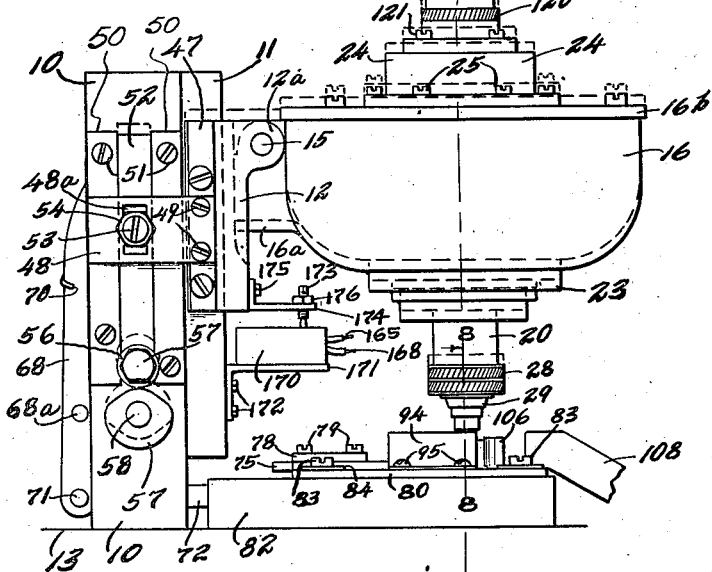
Fig. 2 is a view in side elevation as seen from the side opposite that viewed in Fig. 1, certain parts being indicated in different positions in dotted lines.

Slide 12 has secured to one side thereof by suitable screws 46, a bar 47. A plate 48 is secured to bar 47 by headed screws 49, said plate extending transversely at one side of one of flanges 10a. A pair of bars 50 are secured to the side of said flange 10a by screws 51, which bars are spaced to form a guideway for a slide 52. A headed screw 53 is threaded into slide member 52 and extends through a vertically extending slot 48a in plate 48. A jam nut 54 is provided on screw 53 and engages plate 48. It will be seen that plate 48 is thus connected to slide 52 and by loosening screw 53 and nut 54 adjustment can be had between slide 52 and plate 48. Slide 52 at its lower end has secured thereto a cam roller 56 arranged to rotate on a stud 57 threaded into slide 52. Cam roller 56 is engaged by a cam 57 secured to a shaft 58 journalled in member 10 and extending transversely thereof. Shaft 58 has secured thereto a pulley 59 adapted to be rotated by belt 60 running over another pulley (not shown) and which will be driven by some suitable source of power. With the described construction it will be seen that slide 12 and motor casing 16 together with tube 20 and parts carried thereby will be raised at each revolution of shaft 58. The upper position of said parts is indicated in dotted lines in Fig. 2.

Shaft 58 also has secured thereto at the other side of the machine, a cam 65 adapted to engage a cam roller 66 journalled on a stud 67 secured in a lever arm 68 pivoted on a stud 69 secured in the side of member 10. A torsion spring 70 is coiled about stud 69 and engages member 10 at one end and has its other end engaging the outer side of lever 68. Spring 70 tends to move cam roller 66 toward cam 65. Lever 68 carries a pin 68a arranged to engage the side of member 10 and act as a stop. Lever 68 has pivoted thereto at its lower end by pivot bolt 71 a link 72, the other end of which is pivoted by a bolt 73 to a bar or rod 74 extending through and projecting from a downwardly extending portion 75a of a slide member 75. The said downwardly extended portion 75a works in a suitable slot in plate 80. Slide member 75 is guided between blocks 77 over which is secured a plate 78 by screws 79 disposed adjacent the corners thereof. Blocks 77 rest upon a plate 80 supported upon spaced bars or blocks 81 and 82 and secured to base member 13 by headed bolts 83, having washers 84 disposed between the heads thereof and plate 80.

The articles to be inspected or tested such as the cups 90 are fed by gravity down a slide or chute 91, having a width substantially equal to the diameter of cups 90. Said chute at its lower end is secured to the top of plate 80 by having screws 92 pass through flanges 91a and 91b which extend laterally from said chute, said screws being threaded into plate 80. One side of chute 91 is bent at a right angle to form a guiding portion 91c. It will be noted that one side of block 77 is in substantial longitudinal alignment of one side of chute 91. An angle member 94 is secured to the top of plate 80 by screws 95, the vertical flange of which is parallel to and spaced from guide portion 91c. The slide 75 moves between portion 91c and the vertical flange of angle member 94 substantially midway therebetween and has its end of concave form and adapted to fit against the side of one of the cups 90.

A pair of blocks 98 of substantially cylindrical form are pivoted on studs 99 journalled in plate 80 and said studs have secured to their lower ends beneath said plate respectively links 100 and 101. Said links have adjacent the ends thereof remote form studs 99 elongated slots 100a and 101a. A pin 103 extends vertically through slots 100a and 101a, which pin is secured to a horizontally extending bar 104 secured to a downwardly extending portion 75a of slide 75 by the headed screws 105. Portion 75a extends downwardly through plate 80. Members 98 have secured to one side thereof semi-cylindrical members 106 having flat top portions.

The portion 91a and the vertical flange of member 94 align respectively with the sides of a chute 108, the upper end portion of which rests upon and is secured to plate 80, said chute 108 extending downwardly in an inclined direction from plate 80. A short distance from plate 108 said chute is divided to have diverging portions 108a, having their adjacent sides 108b meeting in an acute angle. A pivot member 110 is mounted for oscillating movement in the bottom of chute 108 and has secured thereto a plate or gate 111 adapted to swing therewith. Pivot 110 has secured to its lower end one end of an arm 112, to the other end of which is secured a rod 113, which in turn is secured to the core 114a of a solenoid 114 having a winding 114b. Core 114a is provided with a chamber 114c from which an aperture 114d leads into the chamber in which core 114a moves. A valve seat is formed about aperture 114d which seat is engaged by a ball 118 which is engaged by a small compression coiled spring 119 which at its other end engages the end of the chamber 114c. The small opening 114e leads from chamber 114c through core 114a to the atmosphere or outside the chamber in which core 114a moves. A very small passage 114f leads from chamber 114c to the chamber within the solenoid in which core 114a moves. One end of a tensile spring 115 is secured to the end of rod 113, the other end of said spring being secured to some suitable stationary support 116a by means of a staple 117a.

A member or shell 120 is secured to the top of cap 24 by screws 121 extending through the peripheral flange thereof. A tube 122 has its lower end fitted in and supported in member 120, which tube has a laterally projecting portion 122a some distance above member 120. A lamp 123 which includes a high candlepower concentrated filament lamp bulb 123a is carried in an oscillatable member 124 forming part of a shell socket 125, through which extends the conductor 126 for lamp 123. A contact member 127 is shown connected to conductor 126 and held in engagement with the tip contact 123b of lamp 123 by a compression coiled spring 128. Member 124 is disposed in a semi-spherical seat formed in a sleeve 129 threaded into the upper end of a shell 130 secured in the upper end of tube 122 in any suitable manner. Member 124 also engages a semi-spherical seat formed in a transversely extending plate or washer 131 secured in shell 130. The lower end of shell 130 is threaded and receives a lens-carrying sleeve 132 threaded therein, in which are disposed lenses 133 and 134, the same being held by a member 135 secured in the lower end of sleeve 132. Lens 134 is convexo-convex and is engaged by the lower side of upper lens 133 which is concave and the upper side of which is flat. A shell 138 is secured in tube 122 below member 135 and carries a member 139 which extends diagonally and traverses the opening into projection 122a. Member 139 is of transparent material such as glass and has its lower surface lightly silvered or otherwise constructed to form a mirror. Said member 139 however is arranged for the passage of light therethrough. The projection 122a has secured therein a tube 140 in which is carried a socket 141 adapted to receive a photo electric cell 142. While cell 142 can be of any photo emissive type it may be either gas-filled or of the vacuum type. In practice an R. C. A. 924 photo cell has been found very satisfactory for the purpose. The line conductors are shown as 144 and 145. Conductors 146 and 147 extend from the line conductors respectively to the terminal leads 116 and 117 of the motor having armature 18. A switch 148 is provided for controlling the motor circuit. A conductor 149 extends from line conductor 144 to the primary of a transformer 150 and a conductor 151 extends from the other end of said primary to the other line conductor 145. A switch 152 is disposed in conductor 151 for controlling lamp 123. A conductor 153 extends from the secondary of transformer 150 to the live or filament side of lamp 123 and the other side of said lamp and the other end of the said secondary are shown as grounded. A conductor 155 extends from line conductor 145 to one end of the winding 114b of solenoid 114. A switch 154 is disposed in conductor 155 for controlling the circuit thereof. Conductor 155 is also connected by another conductor 156 to one of the power supply terminals of a suitable electronic amplifier which may involve one or more vacuum tube amplifier stages of the conventional variety. Another conductor 158 extends from line conductor 144 to the stationary contact 160a of a relay 160. Another conductor 161 extends from the armature 160b of relay 160 to the other end of the winding 114b of solenoid 114. A conductor 162 also extends from conductor 153 to the other power supply terminal of amplifier 157. Conductor 163 extends from photo electric cell 142 to a signal voltage input terminal of the amplifier 157. A conductor 165 extends from a signal output terminal of amplifier 157 to one end of the winding of relay 160. Another conductor 166 extends from the other end of the winding of relay 160 to one terminal 167a of a switch 167. A conductor 168 extends from the other signal output terminal of amplifier 157 to a contact 167b of switch 167. Contacts 167a and 167b are adapted to be connected by a pole or contact 167c of a switch 167. Switch 167 is disposed in a switch box 170 mounted on a bracket 171 connected to the front side of slide 11 by screws 172. The contact 167c is carried by an adjustable threaded member or screw 173 mounted in a bracket 174 secured to the front side of slide 12 by one or more screws 175. Member 173 is provided with a lock or adjusting nut 176 which engages the top of bracket 174.

Figure 1:
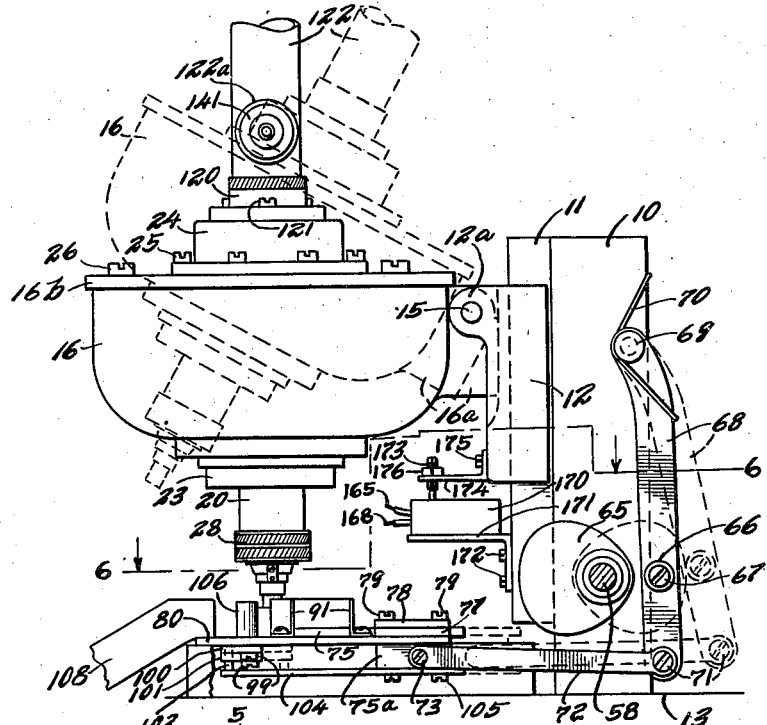
Fig. 1 is a view in side elevation of an apparatus embodying the present invention some parts being shown in different positions in dotted lines.
Figure 3:
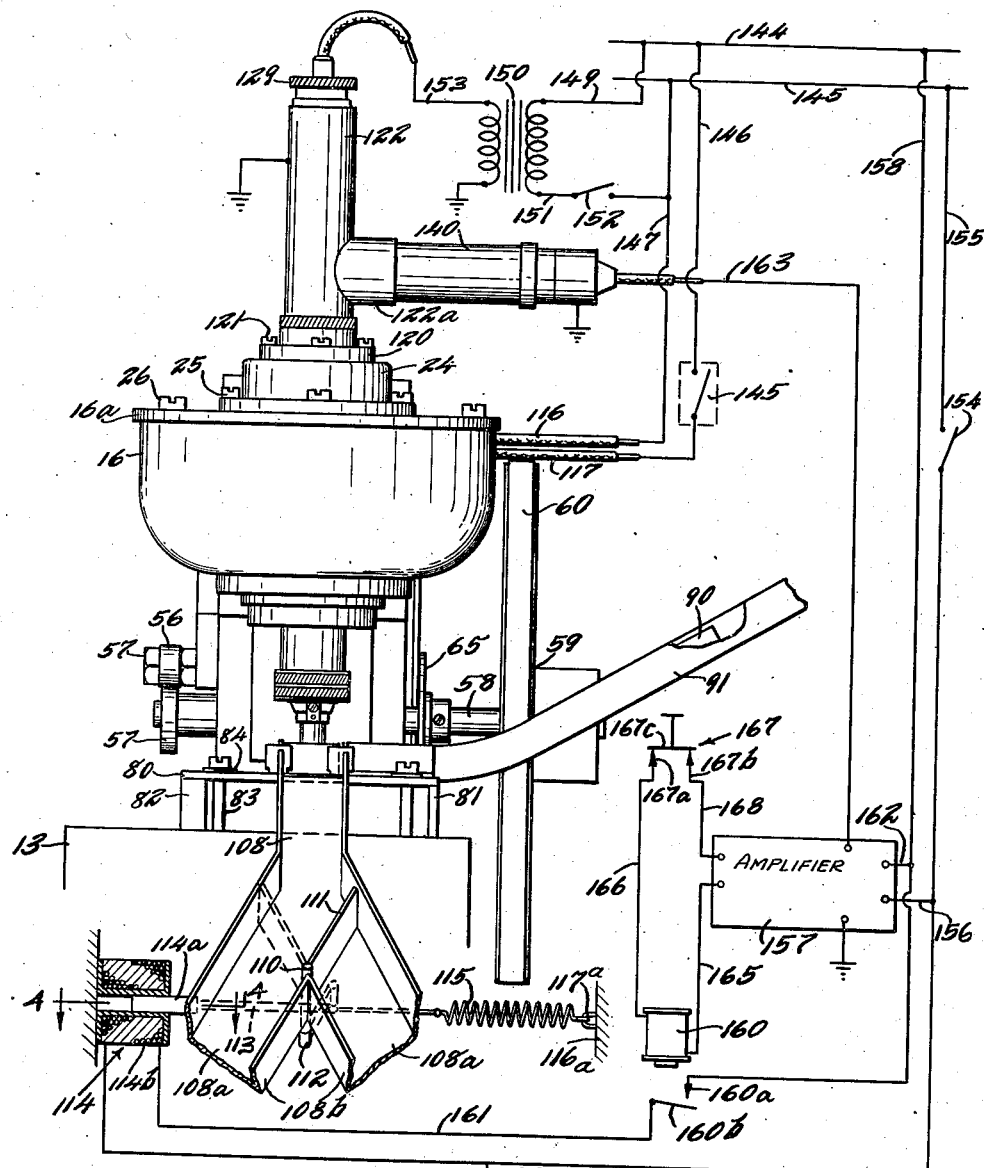
Fig. 3 is a view in front elevation of said apparatus, certain parts being broken away and others shown in vertical section together with a wiring diagram.
Figure 4:
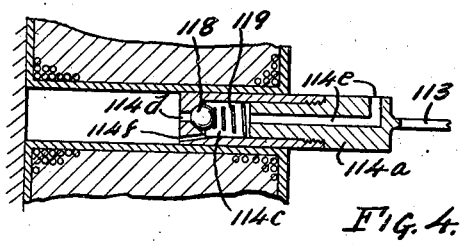
Fig. 4 is a partial vertical section taken on line 4—4 of Fig. 3 as indicated by the arrows, the same being shown on an enlarged scale.
Figure 5:
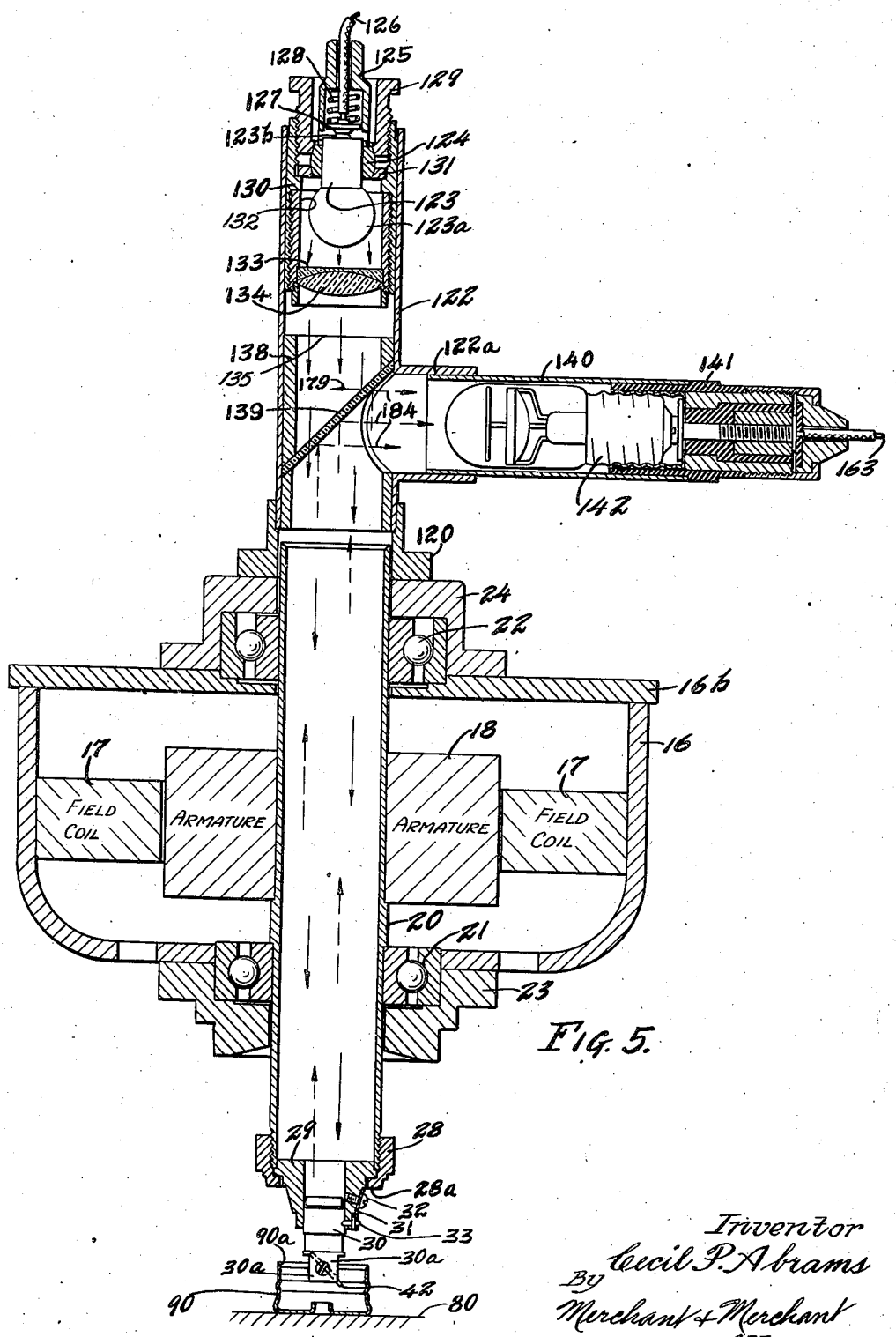
Fig. 5 is a central vertical section through said apparatus taken substantially on line 5—5 of Fig. 2, certain parts being omitted.
Figure 6:
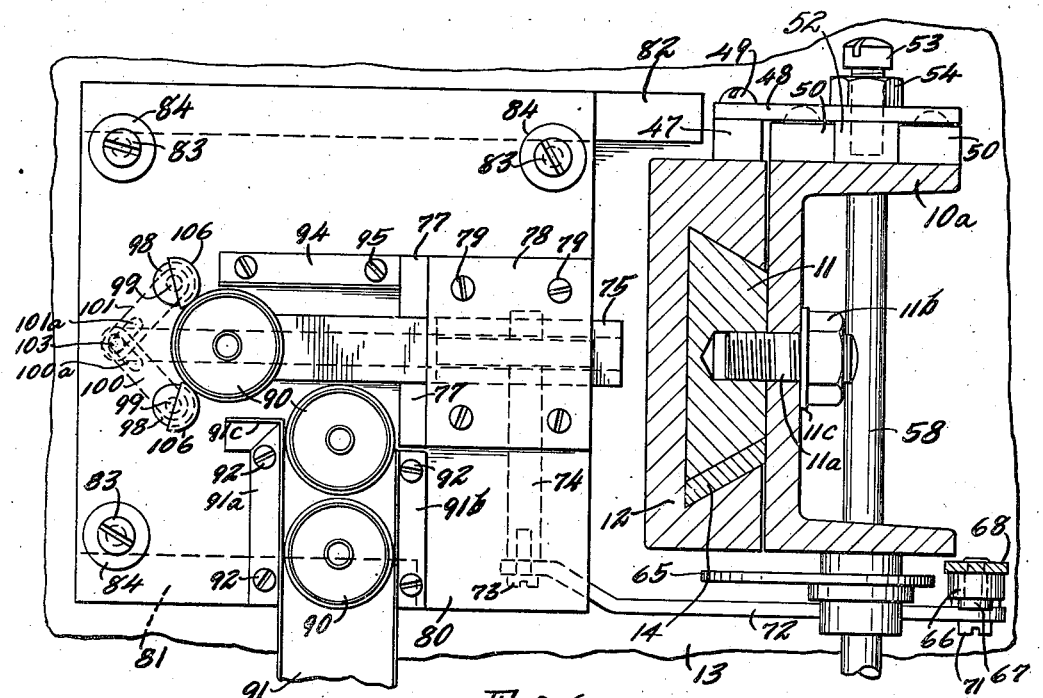
Fig. 6 is a horizontal section taken substantially on line 6—6 of Fig. 1 as indicated by the arrows, certain parts being omitted.

The operation of the novel method and the described apparatus is as follows:

The cups 90 which are to form the end of shotgun shells are fed into the chute 91 in any suitable manner and slide down said chute by gravity. The specific surface to be tested is the frusto conical surface 90a at the inner side of the cup at its open end. Pulley 50 will be driven as described, thus rotating shaft 58 and operating cam 65. As the high side of cam 65 engages cam roller 66, lever 68 is swung to the right as shown in Fig. 1 substantially to the dotted line position and this moves slide 75 to the right as shown in Figs. 1 and 6. Slide 75 moves far enough to the right as shown in Fig. 6 so that the lowermost cup 90 in chute 91 moves in front of slide 75, said cup sliding down until it is stopped against the vertical flange of member 94. At this time cam 57 has been rotated to bring its high side against cam roller 56, thus raising slide 52 and with it slide 12 and motor casing 16 with the parts carried thereby. As previously indicated, by manipulation of screw 53 and nut 54 the points between which plate 48 and slide 12 will rise and fall under the action of cam 57 can be adjusted. Portion 30a and mirror 42 can thus be accurately positioned. The lower end of portion 30a and mirror 42 are thus raised above the top plane or edge of cup 90 so that said cup can slide under portion 30a. It will be understood that switch 148 will be closed so that motor armature 18 will be rotated. Switch 152 will also be closed, thus illuminating lamp 123, and switch 154 will be closed thus putting in operation the circuits of amplifying tube 157. It will be understood that switches 148, 152 and 154 are manually operated. On further revolution of shaft 58 slide 75 is moved to the left as shown in Figs. 1 and 6 and the cup 90 which has moved in front of the slide, is moved to the left and into engagement with members 106 as illustrated in Fig. 6. The cup is now axially aligned with tube 20 and tube 122 as shown in Fig. 5. Cam 58 now moves so that its lower side is in engagement with cam roller 57 and tube 20 and parts carried thereby are lowered. Portion 30a and mirror 42 are thus lowered to the position shown in Fig. 8. As the motor armature 18 is rotated member 30 and mirror 42 are being rotated. The light from lamp 123 passes through lenses 133 and 134 which direct it longitudinally through tube 20 and focus it sufficiently so that a beam of light is directed onto mirror 42 as shown by arrows 180 in Figs. 5 and 8. This light must pass through the member 139 and owing to the said member being constructed as a mirror, some of the light will be absorbed by member 139. Some of the light will also probably be reflected from the upper surface of member 139 as indicated by arrow 179. However ample light passes through member 139 for the desired purpose. The beam of light passes downwardly and is reflected from mirror 42 as indicated by line 181 in Fig. 8 so that it is directed against the surface 90a. Since mirror 42 is rotating the beam of light is caused to travel around surface 90a throughout its whole extent. The beam will be of sufficient scope to cover the width of surface 90a. The light directed on surface 90a is reflected from said surface as indicated by line 182 in Fig. 8 and again strikes mirror 42 and is reflected upwardly longitudinally of tube 20 as indicated by the arrows 183 in Figs. 5 and 8. This reflected light passing upwardly in tube 20 strikes the mirror under surface of member 139 and is reflected so as to pass longitudinally of tube 140 as indicated by the arrows 184. This reflected light transmitted from the mirror surface of member 139 is directed onto photoelectric cell 142. Photoelectric cell 142 is thus actuated and through its conductor 163 effects a bias on tube 157 and when the tube is so biased no current will flow in conductors 165 and 168. It may be stated that when mirror 42 was lowered to position within the cup, member 173 was lowered and switch 167 closed. The circuit from amplifier 157 through switch 167 and relay 160 is therefore closed. As described however no current flows in this circuit as long as the light is being reflected from surface 90a and the reflected light is directed on photoelectric cell 142. Should there be some imperfection in surface 90a so that the light is not reflected therefrom back to mirror 42, there would be an absence or cessation of the reflected light and this would effect cell 142 so that it no longer would bias amplifier 157 and current would begin to flow in the circuit of relay 160. When this happens relay 160 is energized and armature 160b is moved into engagement with contact 160a. This closes the circuit through solenoid 114 and the core 114a is drawn into said solenoid moving to the left as shown in Fig. 3, swinging arm 112 and the plate or gate 111 so that the latter swings to the dotted line position shown in Fig. 3. Normally if the surface 90a is continuous and perfect the cup would be directed so as to move into chute 108 and through the portion 108a thereof at the left of Fig. 3. When gate 111 is swung to the position shown in dotted lines in Fig. 3 the cup will be directed through the portion 108a of chute 108 at the right in Fig. 3 and will thus be rejected. After the mirror 42 has made the required number of revolutions it is again raised by operation of cam 57, slide 75 is again moved to the right and another cup is engaged and moved into axial alignment with tube 20. This cup will engage the cup previously acted upon and the latter will be pushed toward chute 108. As stated the cups are positioned against members 106. Each time slide 75 moves to the right it also moves bar 104 to the right and through the links 99 and 100 turns blocks or members 98 about their axis or pivots 99. Said members 98 are moved to the position shown in Fig. 7 and it will be seen that the members 106 are then moved with their flat sides respectively parallel and parallel with the movement of bar 104. In this position the cup 90 which is engaged by the cup next to be acted upon can be moved between members 106 and into chute 108. In order that gate 11 will be held in position a sufficient period to discard or reject the imperfect cup, the described structure of core 114a has been provided. When solenoid 114 is deenergized, which occurs when mirror 42 is lifted and member 173 moves upward to open switch 167, core 114a would be immediately moved to the right in Fig. 3 by spring 115a. However due to the ball valve 118 which acts as a check valve, core 114a is given a dash-pot action and moves slowly to the right under action of spring 115. Core 114a can only move as air is permitted to pass into its chamber through passage 114f. Gate 111 is thus held in the dotted line position shown for the proper period to direct the imperfect cup into the portion 108a of chute 108 at the right in Fig. 3. The operation of the machine is thus continuous and the cups are continuously and rapidly fed into position, inspected or tested and the imperfect cups rejected.

Motor casing 16 and parts carried thereby can be swung upward to the dotted line position shown in Fig. 1.

From the above description it will be seen that I have provided a novel and comparatively simple and very efficient apparatus for examining or inspecting manufactured parts for detection, imperfections or defects. The articles are progressed to and through the machine very rapidly and the articles having imperfections are rejected and directed into a separate receptacle from those which are perfect. By moving the beam of light along the surface it is possible to have a comparatively simple apparatus. The machine operates automatically and needs very little attention by an operator. The apparatus has been amply demonstrated in actual practice and found to be very successful and efficient.

It will, of course, be understood that various changes may be made in the form, details, arrangement and proportions of the parts without departing from the scope of applicant's invention, which generally stated, consists in a device capable of carrying out the objects above set forth, in the parts and combinations of parts disclosed and defined in the appended claims.

The term "mirror" is herein used in a broad and liberal sense to cover any deflecting or wave-bending devices capable of performing the functions of the mirrors of the apparatus described.

What is claimed is:

1. An apparatus for testing a surface on an article having in combination, means for positioning an article having an annular surface, a source of light, a rotatable mirror for receiving said light from said source and directing it to travel along said surface, said light being reflected from said surface back to said mirror, power means for rotating the mirror, means for receiving said reflected light and transmitting it in a certain direction, and means controlled by said reflected light for moving said article in a certain path if said surface is interrupted so that no light is reflected from said mirror.

2. An apparatus for testing a surface on an article having in combination, means for positioning an article having an annular surface, a source of light, power rotated means for receiving said light from said source and directing the same to cause it to travel around said annular surface, said means being constructed and arranged to receive light reflected from said surface and reflect the same, means for receiving said reflected light and directing it in a certain path, and means located in said path and controlled by said reflected light to direct said article in a certain path if said surface is interrupted so that no light is reflected.

3. An apparatus for testing a surface on an article having in combination, means for positioning an article having an open-ended annular surface to be tested, a source of light, a rotatable mirror for receiving said light from said source and directing it to travel along said surface, said light being reflected from said surface back to said mirror, means for lifting and lowering said mirror, means for positioning said article with the axis of said annular surface substantially aligned with the axis of rotation of said mirror while said mirror is lifted, said mirror being lowered into said article, means for rotating said mirror to cause a beam of light to be directed on and travel around said surface, said light being reflected from said surface, and means controlled by said reflected light for moving said article along a certain path.

4. The structure set forth in claim 3 and means for varying the vertical position of said mirror when lifted and lowered.

5. An apparatus for testing a surface on an article having in combination, means for positioning an article having a surface to be tested, a lamp, a power rotated mirror for receiving light from said lamp and reflecting it to cause it to travel along said surface, said light being reflected from said surface back to said mirror and again reflected toward said lamp, means for receiving said reflected light from said mirror and directing it transversely to the path from said lamp to said mirror, a light-sensitive means on which said reflected light is directed, an electrical circuit controlled by said last mentioned means, and means controlled by said circuit for determining the path of said article if no reflected light is directed on said light-sensitive means.

6. An apparatus for testing a surface on an article having in combination, a motor, a member extending axially of said motor, rotated therewith and having a passage therethrough, a lamp adjacent one end of said passage, a power rotated mirror carried by and rotated with said member at one end thereof and having its surface inclined to the longitudinal axis of said passage, means for positioning an article having an annular surface with the axis of said surface substantially aligned with the axis of rotation of said member, means for disposing said mirror in position to reflect light from said lamp onto said surface to cause it to travel along said surface, said light being reflected from said surface back to said mirror and from said mirror along said passage, means between said mirror and lamp for reflecting said reflected light transversely of said passage, a light-sensitive means onto which said reflected light is directed by said last mentioned means, and means controlled by said light-sensitive means for determining the subsequent path of said article.

7. An apparatus for testing a surface on an article having in combination, a motor rotatable about a vertical axis, a tube extending axially of said motor, a power rotated mirror at the lower end of said tube having an inclined surface, said tube and mirror being rotated by said motor, a lamp disposed to direct a beam of light axially of said tube, means for feeding an article having an annular surface into position vertically aligned with said mirror, said mirror causing the beam of light from said lamp to be reflected onto and to travel around said surface, said light being reflected from said surface back to said mirror and from said mirror upwardly in said tube, a second mirror in said tube between said lamp and first mentioned mirror for receiving said reflected light and directing it transversely of said tube, a light-sensitive means on which said reflected light is directed, and means controlled by said light-sensitive means for determining the subsequent path of said article.

8. An apparatus for testing a surface on an article having in combination, a chute down which articles are fed, said articles having an annular surface to be tested, a reciprocating member adapted to engage said articles and respectively move the same, a pair of spaced stops against which article is positioned by said member, power rotated means for directing a beam of light upon and causing it to travel around said surface, and means for moving said stops to permit said articles to pass therebetween when moved by said reciprocating member.

9. An apparatus for testing a surface on an article having in combination, a lamp, a rotatable mirror, means for raising and lowering said mirror, means operated in synchronism with said means for feeding an open-ended article having a surface to be tested into alignment with the axis of rotation of said mirror so that said mirror may be lowered into said article, means for rotating said mirror to cause a beam of light from said lamp to be reflected onto and to travel around said surface, said light being reflected from said surface to said mirror and reflected from said mirror, and means controlled by said reflected light for determining the path of said article when said mirror is again lifted.

CECIL P. ABRAMS.